J. C. HOOPER.
AUTOMATIC HIGH PRESSURE REDUCING VALVE.
APPLICATION FILED FEB. 21, 1911.
1,036,244.
Patented Aug. 20, 1912.
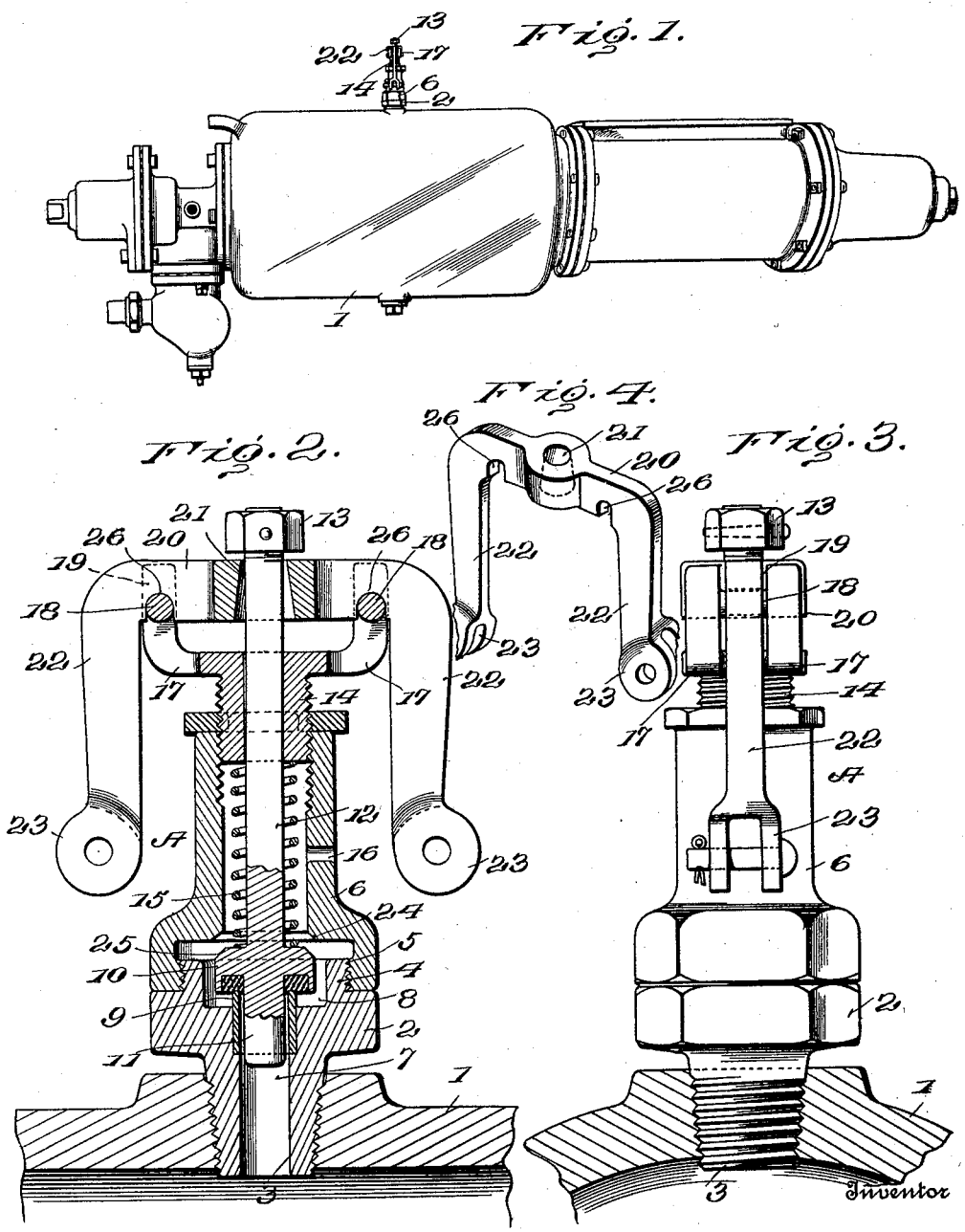
Witnesses
W. N. Woodson
Juana M. Fallin
Inventor
John C. Hooper.
By H. A. Stacey, Attorneys.

UNITED STATES PATENT OFFICE.

JOHN C. HOOPER, OF BRUNSWICK, MARYLAND, ASSIGNOR OF ONE-HALF TO HOWARD MARVIN JONES, OF BRUNSWICK, MARYLAND.

AUTOMATIC HIGH-PRESSURE-REDUCING VALVE.

1,036,244.  Specification of Letters Patent.  Patented Aug. 20, 1912.

Application filed February 21, 1911. Serial No. 610,017.

*To all whom it may concern:*

Be it known that I, JOHN C. HOOPER, citizen of the United States, residing at Brunswick, in the county of Frederick and State of Maryland, have invented certain new and useful Improvements in Automatic High-Pressure-Reducing Valves, of which the following is a specification.

This invention comprehends certain new and useful improvements in air brake systems, and relates particularly to an automatic pressure reducing valve designed to be attached to an auxiliary reservoir, to prevent the overcharging of the train line.

To those versed in the art to which this invention appertains, it is well known that if the engineer's brake valve remains too long in recharging position, the auxiliary reservoir and train line will become overcharged, requiring an application of the brakes to reduce the air pressure to normal, this contingency being extremely likely to happen at the present time with the highly sensitive quick action air brake systems that are now being installed.

With a knowledge of these conditions, my invention aims to automatically prevent this overcharging of the train line, by providing an automatic high pressure reducing valve, and the invention also has for one of its main objects, and more specifically considered, a device of this character which will be simple in its construction and durable and very efficient in operation, being designed for attachment to auxiliary reservoirs in place of the ordinary pressure reducing or bleed valves that have heretofore been employed, the invention also embodying means whereby the valve may be operated manually as well as automatically.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a view illustrating one application of my improved valve; Fig. 2 is an enlarged vertical longitudinal section of the valve, parts being shown in side elevation; Fig. 3 is an end elevation of the valve; and, Fig. 4 is a detail perspective view of a yoke hereinafter specifically described.

Corresponding and like parts are referred to in the following description and indicated in all the views of the drawings by the same reference characters.

Referring to the drawing, the numeral 1 designates an auxiliary reservoir and 2 designates the base of my improved automatic high pressure reducing valve, said base being of hexagonal or other polygonal form, and being provided with a threaded nipple 3 by which it may be screwed into an opening formed in the wall of the auxiliary reservoir 1. The base 2 of the valve casing, said casing being designated A as a whole, is formed at its outer end with an exteriorly threaded extension 4, the threads of which are designed for engagement by the interior threads 5 that are formed on the inner end of the main body portion 6 of the casing.

The base 2 is formed with a longitudinally extending opening 7 leading at its outer end into a chamber 8, a valve seat 9 being provided in the chamber and designed for engagement by a valve body 10, the seat 9 in the present instance being formed by a cylindrical ring or bushing, as best illustrated in Fig. 2. The valve body 10 is formed with an inwardly projecting stem 11 mounted in the opening 7, as shown, and with an outwardly projecting stem 12 protruding from the outer end of the body portion 6 of the valve casing A and provided at its outer end with a head 13 formed by a nut, as shown. The inner face of the head 13 constitutes a shoulder, as is evident.

The outer end of the stem 12 passes through an adjustment nut 14, which works in the threaded outer end of the body portion 6, the inner end of the nut 14 being designed to bear against the outer end of a helical spring 15 which encircles the stem and which bears at its inner end on the outer side of the valve body 10. It is to be understood that this spring 15 has its tension adjusted by the nut 14 to, say, seventy pounds pressure, or to whatever other pressure is to be considered as the normal pressure in the auxiliary reservoir. The wall of the body portion 6 of the valve casing is formed with a port 16 extending therethrough, whereby when the valve body 10 is opened, the pressure within the auxiliary reservoir may be relieved by permitting the air to flow out through the opening 7 into the chamber 8 and thence to the atmosphere through the port 16.

The nut 14 is provided at opposite sides with two pairs of outwardly projecting and substantially parallel bracket arms 17, the arms of each pair being laterally spaced from each other, as best illustrated in Fig. 3, and being joined together near their outer ends by cross bars 18, whereby to provide recesses 19 in the outer ends of the brackets.

20 designates a yoke which is designed to be received in the recesses 19, said yoke being formed with an opening 21 through which the stem 12 extends, whereby the outward movement of the yoke will effect the engagement thereof with the inwardly facing shoulder that is formed by the nut or head 13, and consequently positively open the valve against the tension of the spring 15, when it is desired to manually reduce the pressure. The yoke 20 includes inwardly projecting and substantially parallel arms 22, each of which is forked at its inner end, as at 23, for engagement with an actuating rod, (not shown).

From the foregoing description in connection with the accompanying drawing, the operation of my improved automatic high pressure reducing valve will be apparent. In the practical use of the device, the adjusting nut 14 is manipulated so as to impose, say, seventy pounds pressure or tension on the spring 15. Hence, whenever, for any reason, the pressure in the train line and auxiliary reservoir equipped with my improved valve exceeds seventy pounds, the valve body 10 will be automatically unseated by the pressure of the air and the excess pressure will be permitted to escape to the atmosphere through the port 16, the pressure being thereby automatically reduced. Whenever it is desired to manually unseat the valve, it is only necessary to swing outwardly one of the arms 22, the adjoining end of the main cross bar of the yoke 20 being thereby swung outwardly from its recess 19 and the yoke engaging the head 13, while the opposite end of the cross bar of the yoke rests within its recess and bears upon the bottom thereof (cross bar 18) as a fulcrum. It will thus be seen that the valve can be unseated by the manipulation of either arm 22 and with equal facility, and that no bolts or other means are necessary to pivotally connect the yoke or its arms to the supporting bracket 17, while at the same time a relatively large degree of leverage is produced by the construction and arrangement of parts hereinbefore shown and described. Furthermore, as the brackets 17 of each pair are outwardly offset from the body portion 6 of the casing A and laterally spaced from each other, the arm 22 which swings inwardly as the other arm is positively swung out, will move in between its bracket arms and thereby assist in holding the parts in proper correlated position.

The outer wall of the chamber 8 within the valve casing is defined by a preferably beveled ground seat 24 designed for engagement by the correspondingly formed seat 25 on the valve body 10. In case the spring 15 should break or otherwise lose its proper tension, the pressure of the air within the reservoir will manifestly move the valve body 10 out, whereby to effect the engagement of the seats 24 and 25 and thereby prevent an excessive loss of pressure, the communication between the atmosphere and the interior of the reservoir being effectually closed. Preferably, the yoke 20 is formed with inwardly facing recesses 26 in its inner edge, designed to fit over the cross bars 18 so as to assist in holding the yoke properly in position.

In the preferred construction of the device, the bracket arms 17 are formed integral with the tension adjusting nut 14, whereby said nut may be easily adjusted by grasping and turning the arms.

While the accompanying drawing and foregoing description disclose what I believe to be the preferred embodiment of my invention, it is to be understood that the invention is not limited thereto, but that various changes may be made in the details of construction, arrangement and proportions of the parts without departing from the scope of the invention as defined in the appended claim.

Having thus described the invention, what is claimed as new is:

An automatic and manually operable high pressure reducing valve, including a casing comprising a base and a body portion having a detachable connection with the base, the base being formed with an upwardly facing valve seat and a chamber surrounding the same, the body portion of the casing being formed in its side with a port leading to the atmosphere, a valve body mounted in said casing and arranged for engagement with said seat, a stem secured to the valve body and projecting upwardly out of the upper end of the casing, such end of the casing being interiorly threaded, a spring encircling said stem and bearing at one end upon the valve body, a threaded adjustment plug loosely mounted on the stem and working in the threaded end of the casing and bearing against the other end of the spring, said plug being formed with two pairs of laterally and outwardly projecting arms, and cross pins connecting the respective arms of each pair below the upper extremities of such arms whereby to produce upwardly facing recesses, a nut screwing on the upper end of the valve stem and constituting a head therefor, and a yoke consisting of an apertured cross bar loosely mounted on the stem and adapted to engage the nut, the cross bar being formed in its lower edge with recesses adapted to engage the cross pins, and the cross bar normally lying in said recesses, the yoke also consisting of downwardly extending handle arms, substantially as and for the purpose set forth.

In testimony whereof, I affix my signature in presence of two witnesses.

JOHN C. HOOPER. [L. S.]

Witnesses:
 A. C. STEWART,
 GUY B. DINGES.

Copies of this patent may be obtained for five cents each, by addressing the "Commissioner of Patents, Washington, D. C."